United States Patent [19]

Mogami et al.

[11] Patent Number: 4,556,605
[45] Date of Patent: Dec. 3, 1985

[54] PHOTOCHROMIC COATING COMPOSITION AND PHOTOCHROMIC SYNTHETIC RESIN OPHTHALMIC LENS

[75] Inventors: Takao Mogami; Hiroshi Kawashima, both of Suwa, Japan

[73] Assignee: Kabushiki Kaisha Suwa Seikosha, Tokyo, Japan

[21] Appl. No.: 529,907

[22] Filed: Sep. 7, 1983

[30] Foreign Application Priority Data

| Sep. 9, 1982 | [JP] | Japan | 57-156937 |
| Sep. 10, 1982 | [JP] | Japan | 57-157852 |
| Apr. 27, 1983 | [JP] | Japan | 58-74420 |
| Apr. 28, 1983 | [JP] | Japan | 58-75887 |

[51] Int. Cl.$^4$ .............. B32B 27/08; B32B 27/18; G02B 5/23
[52] U.S. Cl. .................. 428/331; 350/354; 351/163; 351/166; 252/586; 427/164; 428/335; 428/336; 428/413; 428/412; 428/447; 428/451; 428/522
[58] Field of Search ............. 427/164; 351/163, 166; 350/354; 252/586; 428/412, 447, 413, 335, 336, 451, 522, 331

[56] References Cited

U.S. PATENT DOCUMENTS

| 2,404,357 | 7/1946 | Bechtold | 428/336 |
| 3,197,296 | 7/1965 | Eppler | 350/354 |
| 3,429,846 | 2/1969 | Bechtold | 427/393.5 |
| 3,519,635 | 7/1970 | Meriwether | 350/354 |
| 3,530,075 | 9/1970 | Wiebe | 252/586 |
| 3,955,035 | 5/1976 | Ito | 428/334 |
| 4,006,271 | 2/1977 | French | 351/163 |
| 4,046,586 | 9/1977 | Uhlmann | 341/163 |
| 4,049,846 | 9/1977 | Hovey | 427/164 |
| 4,110,244 | 8/1978 | Hovey | 350/354 |
| 4,170,567 | 10/1979 | Chu | 350/354 |
| 4,211,823 | 7/1980 | Suzuki | 427/164 |
| 4,291,098 | 9/1981 | Tanaka | 427/164 |
| 4,343,857 | 8/1982 | Uram | 427/164 |
| 4,367,170 | 1/1983 | Uhlmann | 350/354 |
| 4,405,679 | 9/1983 | Fujioka | 428/413 |
| 4,503,126 | 3/1985 | Phillips | 427/44 |

Primary Examiner—Ellis P. Robinson
Attorney, Agent, or Firm—Blum Kaplan Friedman Silberman & Beran

[57] ABSTRACT

Photochromic coating compositions for synthetic resin ophthalmic lenses to impart photochromic properties to the lenses are provided. The photochromic coating composition includes an organic silicon compound to impart a surface hard coating and a photochromic material dispersed in the hard coat to impart photochromic properties. The photochromic materials may include compounds including the molybdic acid amine group, dithizone-mercury polymers, halogenated silver or copper, and a benzopyrylospiran compound. The coating composition is prepared by dispersing the photochromic material in a silicon hard coating composition. The coating composition may be coated on the surface of a synthetic resin lens by dipping, spraying, spin coating, flow coating and the like and then dry-heated to be cured. The coating composition is applied in thicknesses from about 1 to 30 microns. The synthetic resin lenses which may be coated are transparent resins, such as polycarbonate resins, acryl resin, CR-39 resins, polystyrene and the like.

18 Claims, 1 Drawing Figure

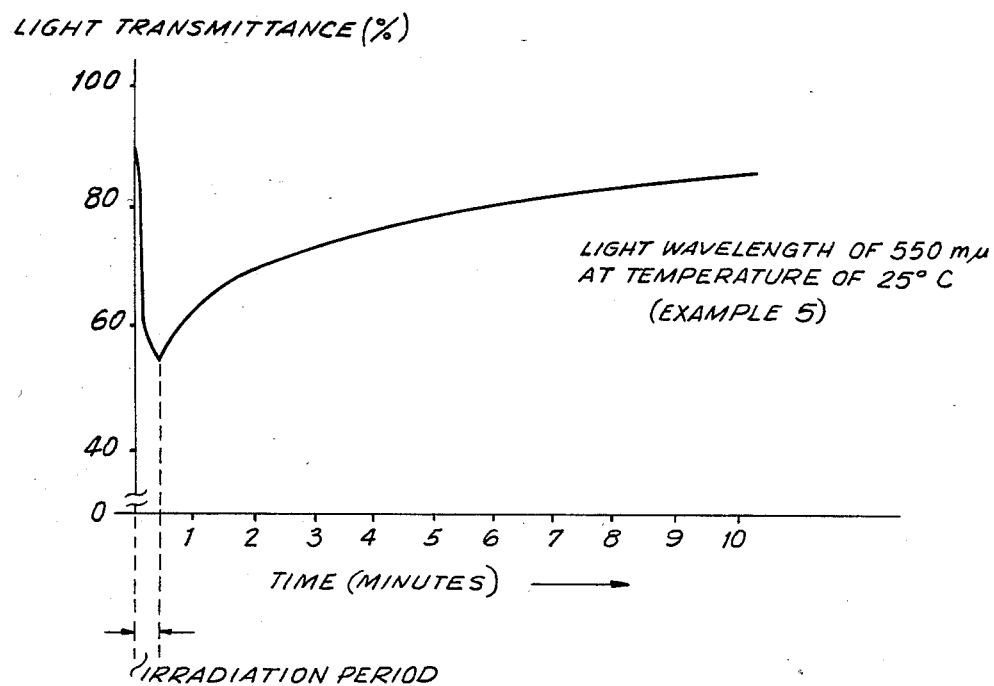

PHOTOCHROMIC COATING COMPOSITION AND PHOTOCHROMIC SYNTHETIC RESIN OPHTHALMIC LENS

BACKGROUND OF THE INVENTION

This invention relates to synthetic resin ophthalmic lenses, and more particularly to lenses having a high degree of surface hardness and photochromic properties wherein light absorbency increases as the ambient light is greater and decreases as the amount of ambient light decreases.

Synthetic resins have come into wide use as a safe material for spectacle lenses in place of inorganic glass since the adoption of standards by the United States Food and Drug Administration in 1972. Following that, the use of synthetic resins in spectacle lenses has also increased in Japan. The extent of use of the most popular synthetic resin for a lens, namely diethylene glycol bisallyl carbonate (hereinafter referred to as "CR-39") has not expanded to over 50% of the lens market in the United States. This is believed due to two disadvantages of CR-39 resin. First, the CR-39 lens will scratch or scar more easily than a lens formed of inorganic glass. Second, CR-39 lenses are not available with photochromic properties, except one model which changes color from a transparent to blue when exposed to light.

This presently available photochromic lens which turns to a blue color is not entirely satisfactory. This is because the absorbency, coloring speed and color fading speed are poor compared to photochromic inorganic glass lenses. The most popular photochromic lenses are those where the color changes from transparent to brown or from transparent to grey when the lens is exposed to light. Accordingly, it is fair to say that the available photochromic synthetic lens is not fully satisfactory.

There are many available techniques for providing photochromic ophthalmic lenses made of inorganic glass which have been commercialized. For example, U.S. Pat. No. 3,197,296 describes various photochromic ophthalmic glass lenses.

There have been several attempts to provide photochromic plastic lenses. For example, U.S. Pat. Nos. 4,049,846 and 4,110,244 describe absorbing silver halide into the swelled surface of a plastic lens. However, sufficient concentration of photochromic material cannot be absorbed and it is difficult to polymerize the surface completely. U.S. Pat. No. 4,170,567 describes utilizing various mercury containing photochromic materials with thermoplastic sheet materials. However, these teachings are not applicable to thermoset synthetic resins lenses, such as CR-39 and the like. This is due to the difficulty of dispersing the photochromic material to the casting monomers and oligomers. It is also not possible to produce multi-ply ophthalmic lenses practically in view of the high cost and techniques.

As noted above, it is difficult to provide synthetic resin lenses having satisfactory photochromic properties for the following reasons:

(1) The process of diffusing photochromic material into a base material and heat-treating cannot be carried out because of inferior heat resistance to synthetic resin lens compared to conventional inorganic glass lenses; and (2) Photochromic materials which can be diffused into synthetic resin base material utilized for ophthalmic lenses, such as CR-39 and the like are not available.

This is due to the fact that photochromic materials are easily oxidized by the peroxide necessarily utilized as initiators in the casting process for forming the lenses.

Accordingly, it is desirable to provide a synthetic resin ophthalmic lens having improved photochromic properties. The lens must overcome the disadvantages of conventional plastic lenses, namely providing sufficient abrasion resistance, high solvent resistance, high impact resistance and have good tintability by a dispersed dye as well as providing the desired photochromic effects.

SUMMARY OF THE INVENTION

A coating composition for imparting a surface hard coat and photochromic properties to a synthetic resin ophthalmic lens and a coated synthetic resin opthalmic lens are provided. The coating composition includes an organic silicon compount or its hydrolyzate and a photochromic material dispersed therein.

The preferred organic silicon compound is at least one silane compound which has been hydrolyzed, the silane compound having the general formula (1) as follows:

$$R^1{}_a-Si-(OR^3)_{4-a-b} \quad\quad (1)$$
$$\overset{R^2{}_b}{|}$$

wherein $R^1$ is an organic group containing at least one group selected from vinyl, propyl, butyl, amino, imino, epoxy, methacryloxy, glycidoxy, phenyl and SH group, $R^2$ is hydrogen, a hydrocarbon group having from one to six carbon atoms or a vinyl group, $R^3$ is a hydrocarbon group having from one to five carbon atoms, an alkoxyalkyl group having from one to five carbon atoms or an acyl group having from one to four carbon atoms, a is an integer 0, 1 or 2 and b is an integer 0 or 1 wherein the relation of a and b is $a+b \leq 2$.

The coating composition includes the silane compound of formula (1), at least one epoxy compound, at least one epoxy-curing catalyst and a photochromic material. The preferred photochromic material is a silver halide, such as silver bromide, silver chloride and silver iodide. Alternatively, the photochromic material may be a benzopyrylospiran compound having the general formula (3) as follows:

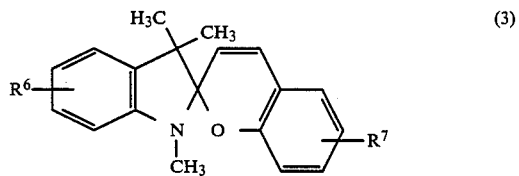

(3)

wherein $R^6$ is hydrogen, fluorine, chlorine, or bromine, and $R^7$ is hydrogen, fluorine, chlorine, bromine, a nitro group or a methoxy group.

When a in the silane compound of formula (1) is one or two, silane (1) may be admixed with a hydrolyzed silane compound having the general formula (2) as follows:

$$R^4{}_c-Si-(OR^5)_{4-c} \quad\quad (2)$$

wherein $R^4$ is hydrogen or a hydrocarbon group having from one to six carbon atoms, $R^5$ is a hydrocarbon group having from one to five carbon atoms, an alkoxyalkyl group having from one to five carbon atoms or an acyl group having from one to four carbon atoms and c is an integer from 0 to 2.

The lens materials which may be coated include such transparent resins as polycarbonate, acryl resins, CR-39 resin, polystyrene and the like. The photochromic coating compositions are coated onto the surfaces of lenses by dipping, spraying, spin coating and flow coating whereby a coat layer of between $1\mu$ to $30\mu$ is formed on the surfaces of the lens. The coat layer is then dry-heated to be cured.

Accordingly, it is an object of the invention to provide an improved synthetic resin ophthalmic lens.

It is another object of the invention to provide an improved synthetic resin ophthalmic lens having a surface hard coat and photochromic properties.

It is a further object of the invention to provide an improved coating composition for a synthetic resin ophthalmic lens.

Still another object of the invention is to provide an improved coating composition for a synthetic resin ophthalmic lens, the composition including an organic silicon compound and a photochromic material.

Still object of the invention is to provide an improved synthetic resin ophthalmic photochromic lens having a hard wearing coat layer including silver halide.

Yet another object of the invention is to provide an improved photochromic synthetic resin ophthalmic lens having a hard wearing coat layer including a benzopyrylospiran compound.

Yet a further object of the invention is to provide an improved coating composition for a photochromic synthetic resin ophthalmic lens including a silane compound, an epoxy compound, an epoxy curing catalyst and a silver halide.

Another object of the invention is to provide an improved photochromic synthetic resin ophthalmic lens including a surface hard coat of an organic silane, including an epoxy compound, an epoxy curing catalyst and a silver halide.

A further object of the invention is to provide an improved photochromic synthetic resin ophthalmic lens including a surface hard coat of an organic silicon compound, an epoxy compound, an epoxy curing catalyst and a benzopyrylospiran compound.

Still another object of the invention is to provide a method of preparing a photochromic synthetic resin ophthalmic lens having a surface hard coat.

Still another objects and advantages of the invention will in part be obvious and will in part be apparent from the specification.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWING

For a fuller understanding of the invention, reference is had to the following description taken in connection with the accompanying drawing, in which:

The sole FIGURE is a graph illustrating the change in light transmittance over time for a photochromic synthetic resin ophthalmic lens in accordance with the invention.

DESCRIPTION OF THE PREFERRED EMBODIMENTS

The coating composition for the synthetic resin opthalmic lenses in accordance with the invention includes an organic silicon compound and/or its hydrolyzate and a photochromic material. By providing such a coating composition for the ophthalmic lens, several advantages are attained. These include:

(1) A desirable end transmittance; namely, a transmittance wherein the absorbence of the lens does not vary by further irradiating with light by a photochromic lens tester. This is achieved by adjusting the thickness of the coating film and the concentration of the photochromic material.

(2) Preferred colors can be developed by using one or more than one selected photochromic materials. In particular, a variety of colors can be obtained by using various organic photochromic compounds.

(3) In addition to achieving the desired photochromic properties as outlined in (1) and (2), above, the surface of the lens is coated with a hard film which provides scratch resistance, chemical resistance, solvent resistence, impart resistance and good tintability by dispersed dyes.

The silicon hard coating portion of the coating compositions utilized in accordance with the invention may be the silicon containing coatings described in the prior art such as U.S. Pat. Nos. 2,404,357, 3,429,846, 4,211,823 and 3,955,035. The photochromic materials which are included in the coating composition may be the conventional photochromic materials described above. In addition, compounds including a molybdic acid amine group for providing improved color sensitivity and preventing photo deterioation, or dithizone-mercury polymers as disclosed in *J.Appl. Polym. Sc.,* 745 (1973) can also be utilized. Halogenated silver or halogenated copper, either alone or diffused in a glass matrix, can be added to the hard coating composition in the form of a fine powder or slurry in a suitable solvent.

The coating compositions of the invention are prepared by dispersing and mixing the photochromic material in the silicon hard coating composition. If desired, surfactants, thixotropic agents, organic polymers, inorganic fine silica particles, metallic powder, curing catalysts, ultraviolet absorbing agents and the like may be added to the coating solution as desired.

The silicon compound utilized in the coating compositions include at least one silane compound having the general formula (1) as follows:

(1)

wherein $R^1$ is an organic group containing at least one group selected from vinyl, propyl, butyl, amino, imino, epoxy, glycidoxy, methacryloxy, phenyl, and SH group, $R^2$ is hydrogen, a hydrocarbon group having from 1 to 6 carbon atoms or a vinyl group, $R^3$ is an hydrocarbon group having from one to five carbon atoms, an alkoxyalkyl group having from 1 to 5 carbon atoms or an acyl group having from 1 to 4 carbon atoms, a is an integer 0, 1 or 2 and b is an integer 0 or 1, wherein the relation of a and b is $a+b \leq 2$.

In one embodiment of the invention the silane compound of formula (1) is admixed with a silane compound having the general formula (2) as follows:

$$R^4{}_c-Si-(OR^4)_{4-c} \qquad (2);$$

wherein $R^4$ is hydrogen or a hydrocarbon group having from 1 to 6 carbon atoms, $R^5$ is a hydrocarbon group having from 1 to 5 carbon atoms, an alkoxyalkyl group having from 1 to 5 carbon atoms or an acyl group having from 1 to 4 carbon atoms, and c is an integer from 0 to 2.

Both silane compounds of formula (1) and formula (2) are hydrolyzed when preparing the coating compositions.

The following silane compound corresponding to the silane compounds of formula (1) hydrolyzed in accordance with the invention are as follows:
vinyltrimethoxysilane
vinyltriethoxysilane
ethylenediaminopropyltrimethoxysilane
γ-aminopropyltrimethoxysilane
γ-glycidoxypropyltrimethoxysilane
γ-glycidoxypropyltriethoxysilane
γ-glycidoxypropylmethyldimethoxysilane
γ-glycidoxypropylmethyldiethoxysilane
β-glycidoxyethyltrimethoxysilane
β-(3,4-epoxycyclohexyl)ethyltrimethoxysilane
γ-(3,4-epoxycyclohexyl)propyltrimethoxysilane
γ-methacryloxypropyltrimethoxysilane
γ-methacryloxypropylmethyldimethoxysilane
phenyltrimethoxysilane
γ-mercaptopropyltrimethoxysilane
(2,3-epoxypropoxy)methyltrimethoxysilane The following silane compounds corresponding to the silane compounds of formula (2) which are hydrolyzed in accordance with the invention are as follows:
tetramethoxysilane
tetraethoxysilane
tetrapropoxysilane
tetrabutoxysilane
methyltrimethoxysilane
methyltriethoxysilane
methyltripropoxysilane
methyltributoxysilane
ethyltriethoxysilane
propyltriethoxysilane
butyltriethoxysilane.

The above-noted silane compounds are easily hydrolyzed in water or in an aqueous solution including nitric acid, sulfuric acid, acetic acid, phosphoric acid or the like. The hydrolysis may take place in the presence or absence of a solvent, such as an alcohol and the like. In this latter case, the products obtained by hydrolyzing a mixture of silane compounds of the formula (1) and the resulting product of hydrolyzing the alkoxy group, or dehydrating the silanol partially provide the same effect as the above-noted hydrolyzed silane compounds when included into the coating composition.

The silane compounds are generally mixed in a solvent, such as an alcohol, ketone, ester, ether, cellosolve, organic halide, carboxylic acid, aromatic compound, or mixtures thereof. In the presence of a co-soluble organic polymer, a curing catalyst and a surfactant, a thixotropic agent, an inorganic fine silica and the like, a coating compositions including the silane compounds provide suitable coatability properties, such as its leveling property, viscosity and drying.

When a mixture of silane compounds of formula (1) and formula (2) are utilized, the preferred photochromic material is a silver halide. Preferably, the silver halide is silver bromide, silver chloride or silver iodide. In the most preferred embodiment of this aspect of the invention, silver bromide is particularly preferable.

In one aspect of the invention, the coating composition includes a silane compound of formula (1) which includes an epoxy group or the silane compound of formula (1) is admixed with a compound containing an epoxy group and an epoxy-curing catalyst. In this case, the silane compound of formula (1) as described above is admixed with the epoxy compound. The epoxy compound is selected from mono-, di-, tri- and tetra-glycidyl ethers which are formed from polyhydric alcohols, such as (poly)ethyleneglycol, (poly)propyleneglycol, glycerol, neopentylglycol, 1,6-hexanediol, trimethylolpropane, pentaerythritol, diglycerol, sorbitol, bisphenol A which may include remaining —OH groups, and unsaturated fatty acid compounds such as oleic acid wherein the double bonds are totally or partially epoxiated.

A curing catalyst capable of curing epoxy resins is included in the coating composition, such as Lewis acid and a Broensted acid. Examples of suitable epoxy-curing catalyst are $BF_3$, $SnCl_4$, $SnCl_2$, $ZnCl_2$, $FeCl_3$, metal chelate compounds of aluminum, titanium, zirconium and the like and HBr, $HNO_3$, $H_3PO_4$, carboxylic acids and sulfonic acids.

The components are mixed in a solvent of the type described above. When utilizing the silane compounds of formula (1), the photochromic material may include the silver halide compounds noted above. Additionally, copper halide, including both the monovalent and bivalent metal ions can be included in the coating composition.

When the coating composition includes the silane compound of the general formula (1), a material including an epoxy group and at least one curing catalyst, the photochromic material may be a benzopyrylospiran compound having the general formula (3), as follows:

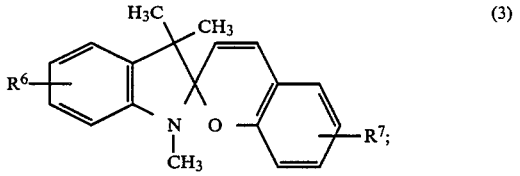

wherein $R^6$ is hydrogen, fluorine, chlorine and bromine, $R^7$ is hydrogen, fluorine, chlorine, bromine, a nitro group and a methoxy group.

The following benzopyrylospiran compounds of formula (3) may be utilized in accordance with this aspect of the invention;
1,3,3-trimethylindolino-6'-nitrobenzopyrylospiran
1,3,3-trimethylindolino-5-chloro-6'-nitrobenzopyrylospiran
1,3,3-trimethylindolino-6'-nitro-8'-methoxybenzopyrylospiran
1,3,3-trimethylindolino-7'-nitrobenzopyrylospiran
1,3,3-trimethylindolino-7'-chlorobenzopyrylospiran
1,3,3-trimethylindolino-8-bromo-8'-bromobenzopyrylospiran
1,3,3-trimethylindolino-6'-nitro-8'-fluorobenzopyrylospiran 1,3,3-trimethylindolino-6′-bromo-8′-nitrobenzopyrylospiran
1,3,3-trimethylindolino-5′-nitro-8′-methoxybenzopyrylospiran
1,3,3-trimethylindolino-6′-bromobenzopyrylospiran
1,3,3-trimethylindolino-8′-methoxybenzopyrylospiran.

The photochromic coating compositions prepared in accordance with this aspect of the invention including a benzopyrylospiran compound provide additional advantages over conventional coating compositions described above. First, it is possible to provide photochromic effect of a gray color, as well as various other colors together with improved resistance to deterioration. The desired photochromic color effect is obtained by dissolving a mixture of select spiropyran compounds in a coating composition. For example, in order to obtain a dark brown photochromic effect, the coating composition including a mixture of spiran compounds of 1,3,3-trimethylindolino-8-bromo-6′-bromobenzopyrylospiran, 1,3,3-trimethylindolino-7′-nitrobenzopyrylospiran and 1,3,3-trimethylindolino-5′-nitro-8′-methoxybezopyrylospiran in the proportion by weight of 3:1:2.

Other colors which heretofore have been unattainable by use of a single spiropyran compound can be attained by a coating composition including a mixture of selective photochromic spiropyran compounds as disclosed by G. H. Brown, in "Photochromism".

The second advantage, namely improved resistance to deterioration appears to be due to improved curing of the coating composition. This results in increasing the cross linking rate of the silane compounds in the coating composition.

In addition to these advantages, the resulting coating composition in accordance with the invention is of uniform thickness even when applied to a base material of uneven thickness because the coating is disposed across the surface of the base material. Coating in accordance with the invention overcomes defects in prior art photochromic ophthalmic lenses wherein the photochromic material is incorporated in an uneven depth into the base material, thereby resulting in an uneven thicknesses.

The resulting photochromic coating compositions in accordance with all embodiments of the invention including the silicon containing compound and a photochromic material are coated onto synthetic resin ophthalmic lenses by conventional coating processes. These include the dipping process, spraying, spin coating and flow coating to form the coat layer on the surface of the lens. The coat layer is then dry-heated to cure the coating. The required heating time and temperature vary according to the characteristics of the base material to be coated. Preferably, the thickness of the cured coat is between about 1 to 30 microns. A cured coat layer of less than 1 micron in thickness will not provide a sufficient abrasion resistant coating, while increased effects are not obtained when the cured coat is thicker than 30 microns.

The photochromic coating compositions prepared in accordance with the invention may be applied to the surface of any transparent synthetic resin ophthalmic lens. For example, the base synthetic resin may be a polycarbonate resin, an acryl resin, a CR-39 resin, a polystyrene resin and similar resins.

Coating compositions and lenses coated with the composition in accordance with the invention will be described in detail in the following working examples. The following descriptions are intended solely as illustrations, and without any limiting effect. The parts indicated in the examples are all on a weight basis. The coated lenses were evaluated by the following tests which are reported in the tables following each group of related examples.

The tests performed on each lens are as follows:

1. Photochromic Performance

The lenses were examined by using a photochromic lens tester designated HE-223 and manufactured by Hasegawa Pico Company Ltd. of Japan. The photochromic lens tester has a rating of 200 watts at 100 volts which provides intermittent light for 25 seconds. Acceptable photochromic lenses were those which exhibited an average decrease in transmittance of 30% at the visible wave length region and which returned to the initial transmittance in the dark.

2. Abrasion Resistance

The lenses were rubbed with #0000 gage steel wool in a back-and-forth motion under a load of 1 Kg. The surface was then examined by the naked eye and classified into the following grades from A to E, according to the extent of scratches and scars on the surface as follows:

A: a rubbed coat exhibited no scratches or scars within the range of 1 to 3 cm;
B: a rubbed coat exhibited from one to ten scratches or scars within 1 to 3 cm range;
C: a rubbed coat exhibited from ten to one hundred scratches or scars within the 1 to 3 cm range;
D: a rubbed coat exhibited innumerable scratches or scars with some parts of the surface thereof remaining smooth; and
E: a rubbed coat had innumerable or serious scratches or scars with no part of the surface thereof remaining smooth.

3. Adhesion of Applied Coat

A cross-cut tape test was performed on each lens. The coating on the surface of the lens was cut with a knife into 100 squares, each having an area of 1 mm × 1 mm. A cellophane adhesive-back tape was applied and then removed. The adhesion was evaluated based on the ratio of the number of squares remaining on the surface to the initial number of 100.

4. Hot Water Resistance

The lenses were dipped in boiling water for one hour. The condition of the coating was examined by the naked eye.

5. Heat Resistance

The lenses were placed in a heated oven at a temperature of 130° C. for two hours. The condition of the lens coating was examined with the naked eye.

6. Chemical Resistance

The lenses were dipped into a solution of 95% ether, acetone, a solution of 3% sulfuric acid and a solution of 1% sodium hydroxide each for 48 hours. The lens coating was examined with the naked eye.

7. Impact Resistance

A ⅜ in. steel ball was dropped onto each lens from a height of 50 in. The lens coating was then examined. This is the so-called "falling steel ball test" as defined by the U.S. FDA.

8. Tintability by Dispersed Dye

The coated lens was dipped into a solution of 2% Terasil Black B (manufactured by Ciba Geigy) in water at a temperature of 85° C. for 5 minutes. The lenses exhibiting more than 25% average absorbance in the visible wave length were deemed excellent.

EXAMPLE 1

Into a 1 liter glass reactor having a stirring device and a reflux condenser was added 124 parts of γ-glycidoxypropylmethyldiethoxysilane and 18 parts of 0.05N hydrochloric acid solution under stirring. The solution was heated to 40° C. for one hour, and 135 parts of dispersed in methanol colloidal silica ("methanol silica sol OSCAL-1132" having a solids content of 30% manufactured by Shokubai Kasei Co., Ltd.) and 4.5 parts of aluminum acetyl acetate were dissolved therein. A solution of 4.5 parts of thiocarbazonatepolymer of P-acrylamidephenyl-mercury was mixed and dispersed in 50 parts of dimethylformamide and was gradually added to the reactor. At this time, the solution prepared a light orange color. Then, 0.02 parts of a silicon copolymer of alkylene oxide with dimethyl siloxane ("Y-7006" manufactured by Nippon Unicar K.K. of Japan) and 7 parts of phenyl Cellosolve were added to the reaction to provide a coating composition. The viscosity of the composition measured on Brookfield-type viscometer was 5 centipoise.

The coating composition was coated on a CR-39 lens ("Seiko Plax" manufactured by Suwa Seikosha Co., Ltd. of Tokyo, Japan) by the dipping process under a lifting-up speed of 20 cm/min. The coated lens was heated for one hour in a hot air oven at a temperature of 80° C. and for 2 hours at 130° C. The resulting light-orange color lens changed to dark-red or a brown color after irradiation in the photochromic lens tester, and subsequently returned to the former color within one minute and showed a good photochromic performance.

The lens was tested under the above-described Tests 1–6 and the results are set forth in Table 1.

EXAMPLE 2

In a glass reactor equipped with a stirring device was added 80 parts of (2,3 epoxypropoxy)methyltrimethoxysilane, 72 parts of tetramethoxysilane and 20 parts of glycidyl methacrylate under stirring. The contents were irradiated with γ radiation from Co 60 at a rate of $1 \times 10^6$ R/Hr at room temperature for 2 hours. Then, 40 parts of a solution containing isopropyl alcohol and methanol in a 1:1 ratio, 36 parts of 0.1N hydrochloric acid, 0.3 parts of perchloric acid, 2.1 parts of 2-(2',4'-dinitrobenzyl)pyridine, 0.02 parts of the Y-7006 silicone described in Example 1 and 0.8 parts of a polyoxyethylene glycol flow control agent ("DISLON AQ 4200-10N" manufactured by Kusumoto Chemicals, Ltd.) was added to increase the viscosity which permits control of the solution so as to provide a coating composition which is manageable.

A CR-39 board was coated with the coating composition by dipping. The CR-39 board had been previously washed with aqueous alkaline solution to degrease it and was heat-cured for one hour at 90° C. and for 2 hours at 110° C. in a hot air oven. The resulting clear transparent lens changed to a yellowish-brown color after irradiation with light. The lens discolored under heat radiation and exhibited a good photochromic response.

The results of Tests 1–7 performed on the coated lens are set forth in Table I.

EXAMPLE 3

Silver bromide was powdered to about 100 mesh. Then, 10 parts of a solution containing 1:1 parts of isopropyl alcohol and dimethylformamide were added thereto and mixed with the silver bromide to form a slurry. The slurry was added to a mixture of 50 parts of "KP-A" solution and 5 parts of "KP-B" solution ("KP-80" is a polysilicon polymer with silicon as the main compound manufactured by Shinetsu Kagaku Kogyo Co., Ltd.). The KP-A solution is the denatured polysilicon polymer and the KP-B solution is the curing agent. The slurry was mixed at 2000 rpm by means of a homogenizer to provide a coating composition.

A CR-39 lens which had been previously processed with a primer of (a solution containing 10:1 parts of "PC-A" solution and "PC-B" solution of "primer PC" by Shinetsu Kagaku Kogyol Co., Ltd. of Japan. The PC-A solution is a denatured silicon polymer comprising mainly acryl or methacryl groups and PC-B solution is the curing agent for PC-A. The lens was dipped into the coating composition and removed at a lifting-up speed of 35 cm/min and heat-cured at 90° C. for 3 hours.

The results of Tests 1–7 are set forth in Table 1.

EXAMPLE 4

Into the glass reactor were added 200 parts of tetraethoxysilane, 139.6 parts of ethanol and 45 g of 0.1N hydrochloric acid solution under stirring at room temperature. Preparation of the solution was exothermic and the solution reached 50° C. This solution was left to stand at room temperature for twenty-four hours in order to age it. After aging, 66 parts of the solution was removed and mixed with 66 parts of glacial acetic acid, 33 parts of ethanol and 33 parts of an ethanol solution containing 10% of a hydrolyzate of a copolymer of tetrafluoromethylene and vinyl acetate.

To this latter solution was added 0.5 parts of trimolybdic acid dimethylamine salt which was mixed with 5 parts of ethanol, under stirring at 20,000 rpm for 30 minutes by a homogenizer to disperse the salt. The resulting coating solution was coated by the flow-coating process onto a CR-39 lens which had been previously degreased by washing with an aqueous alkaline solution. The coated lens was heat-cured for 30 minutes at 80° C. and then for 2 hours at 130° C.

The coated lens was almost colorless and changed to dark brown after irradiation of light by means of the tester. The lens returned to the initial color within two minutes in the dark, so that the lens was considered to have good photochromic properties. This process of coloring and discoloring was repeated at least more than 100 times.

The results of Tests 1–7 are set forth in Table 1.

TABLE I

| Test | (1) Photochromic property | (2) Abrasion resistance | (3) Adhesivity of coat | (4) Heat-water resistance | (5) Heat resistance | (6) Chemical resistance | (7) Impact resistance |
|---|---|---|---|---|---|---|---|
| Example 1 | excellent | B | good (100/100) | stable | stable | stable | excellent |
| Example 2 | excellent | B | good (100/100) | stable | stable | stable | excellent |
| Example 3 | excellent | B | good | stable | stable | stable | excellent |

TABLE I-continued

| Test | (1) Photochromic property | (2) Abrasion resistance | (3) Adhesivity of coat | (4) Heat-water resistance | (5) Heat resistance | (6) Chemical resistance | (7) Impact resistance |
| --- | --- | --- | --- | --- | --- | --- | --- |
| Example 4 | excellent | A | (100/100) good (100/100) | stable | stable | stable | excellent |
| Reference Example | | | | | | | |
| CR-39 lens | colorless | D | — | stable | stable | stable | excellent |
| Inorganic glass | colorless | A | — | stable | stable | stable | inferior |
| VISTA* SUNRAPID | excellent | A | — | stable | stable | stable | inferior |

*Trade name for a photochromic inorganic glass lens including silver halide manufactured by Hattori Seiko Co., Ltd. of Tokyo, Japan.

EXAMPLE 5

The lens of this example was processed by the following two steps;

(1) Hydrolysis of γ-glycidoxypropyltrimethoxysilane and tetramethoxysilane.

Into a glass reactor equipped with a stirrer and reflux condenser were added 67 parts of γ-glycidoxypropyltrimethoxysilane, 101 parts of tetramethoxysilane and 135 parts of isopropyl alcohol. To this was added 77 parts of a 0.05 normal nitric acid solution under violent stirring at room temperature. After the hydrolysis was completed, the solution was stirred further for an hour at room temperature. The resulting solution was permitted to stand undisturbed for one day and night at room temperature in order to age it.

(2) Preparation of a coating composition and coating onto a lens surface.

The resulting solution prepared in step (1) was stirred for half an hour at room temperature in the presence of 0.3 part of stannous chloride and 0.2 part of a silicon based surfactant, to which was further added 9 parts of silver bromide having an average particle size of 100 mμ. This was followed by stirring for an additional 1 hour in a homogenizer at a speed of 20,000 rpm to provide a mixed dispersion. The mixed dispersion which serves as the coating composition was coated onto a CR-39 lens by the dipping process. The lifting speed was 20 cm/min and the lens was cured in a hot air oven at a temperature of 80° C. for half an hour, and at a temperature of 120° C. for one and one-half hours. The cured coat on the lens surface was transparent with a somewhat yellowish color and was 3μ thickness.

The coated lens was subjected to the above-mentioned Tests 1–6 and the results are set forth in Table II.

The graph in the FIGURE shows the relationship between the change in light transmittance over time for the coated CR-39 lens prepared in this Example 5. The lens had a 92% light transmittance at the visible wavelength region at a temperature of 25° C. before irradiation.

The lens was darkened by irradiation with light having a wavelength of 550 mμ of the stroble-type flash of the HE-223 photochromic lens tester for 25 seconds. In order to be considered having excellent photochromic properties, a lens must transmit less than 62% of the light after such irradiation for 25 seconds. In other words, a lens having an average of more than 30% light absorbence at the visible wavelength region initially passes the test. The transmittance of the lens recovered as time elapsed after irradiation was completed. The change in the light transmittance of the lens was observed for 10 minutes following the start of irradiation.

EXAMPLE 6

Into the glass reactor equipped with a stirrer and reflux condenser was added 141 parts of γ-glycidoxypropyltrimethoxysilane, 61 parts of tetramethoxysilane and 180 parts of methylcellosolve to which was added 142 parts of 0.01N nitric acid solution under violent stirring. The subsequent procedure was the same as that in step (1) of Example 5 to provide a hydrolyzed solution of γ-glycidoxypropyltrimethoxysilane and tetramethoxysilane.

The resulting solution was stirred for an hour at room temperature in the presence of 1 parts of lead chloride and 0.4 parts of a silicon based surfactant to which was further added silver iodide having an average particle size of 50 mμ, followed by stirring for another half-hour in order to diffuse the silver iodide sufficiently.

The coating solution, which serves as coating material, was coated onto a polycarbonate resin lens in the same manner as the lens in step (2) of Example 5. The resulting lens, which was transparent with a somewhat yellowish color had a coating of 5μ in thickness on the surface thereof.

The results of Tests 1–6 performed on the lens are set forth in Table II.

EXAMPLE 7

A mixture of 97 parts of β-(3,4-epoxycyclohexyl)ethyltrimethoxysilane, 13 parts of methyltrimethoxysilane, 15 parts of Aerosil having an average particle size of about 15 mμ (manufactured by NIPPON AEROSIL Company Ltd. of Japan) and 4.5 parts of tetrabutoxytitanium was stirred in the glass reactor for 4 hours at room temperature, to which was further added dropwise in the course of 10 minutes, 4.5 parts of water with violent stirring. The solution was permitted to stand undisturbed for 24 hours at room temperature to age the solution.

To the aged solution, 7 parts of silver bromide having an average particle size of about 50 mμ, followed by stirring for a half-hour by the 20000 rpm homogenizer at room temperature. The resulting solution, which served as a coating composition, was applied by the dipping process (with a lifting speed of 10 cm/min) to the surface of a polymethylmethacrylate sunglass lens manufactured by injection molding. The applied coating was cured in a hot air oven at a temperature of 60° C. for an hour followed by a temperature of 80° C. for 3 hours. The resulting coated lens which was transparent with a somewhat yellowish color had a coat of 2.5μ thickness on the surface thereof.

The results of Tests 1–6 performed on the lens are set forth in Table II.

EXAMPLE 8

Into the glass reactor were added 149 parts of γ-methacryloxypropyltrimethoxysilane, 83 parts of tetraethoxysilane, 155 parts of isopropyl alcohol and 0.7 parts of a silicon based surfactant under stirring conditions. With stirring at room temperature, 80 parts of 0.05N nitric acid solution was added followed by stirring for an additional hour. After standing undisturbed for 24 hours for ageing, 12 parts of silver bromide having an average particle size of about 50 mμ were added and the solution was stirred for one hour at room temperature.

The resulting mixed dispersion which serves as a coating composition was coated onto a SEIKO Hi-Lord synthetic resin lens (manufactured by Hattori Seiko Co., Ltd. of Tokyo, Japan) by the dipping process at a lifting speed of 5 cm/min. The lens comprises denatured bisphenol A dimethacrylate as a main component and has a refractive index of 1.60 which is higher than a CR-39 lens. The lens was cured in the same manner as that in Example 5 to provide a photochromic lens with a high refractive index. The coated lens was transparent with a somewhat yellowish coating of 2.5μ in thickness.

The results of Tests 1–6 performed on the lens are set forth in Table II.

The solution obtained in step (1) was stirred for one half-hour at room temperature in the presence of 115 parts of 1,6-hexanedioldiglycidylether (called EPOLITE 1600 and manufactured by Kyoeisha Yushi Chemical Co., Ltd. of Japan), 1.2 parts of stannous chloride and 0.2 parts of a silicon containing surfactant. There was further added 45 parts of silver bromide having an average particle size of 50 mμ followed by stirring for an additional one hour to provide a mixed dispersion. The mixed dispersion which serves as a coating composition was coated onto a CR-39 lens by the dipping process with a lifting speed of 20 cm/min. The lens was then cured in a hot air oven at a temperature of 80° C. for one half-hour and further at a temperature of 120° C. for one and one-half hour. The cured coat on the lens surface was transparent with a somewhat yellowish color and 3μ in thickness.

The coated lens was subjected to the above-described Tests 1–6 and 8 and the results are set forth in Table III.

EXAMPLE 10

Into the glass reactor equipped with a stirrer and a condenser was added 100 parts of γ-glycidoxypropyltrimethoxysilane, 60 parts of vinyltrimethoxysilane and 200 parts of ethylcellosolve under stirring. There was added 60 parts of 0.01N nitric acid solution under violent stirring. The subsequent procedure was the same as that in step (1) of Example 9 whereby the hydrolyzed solution of γ-glycidoxypropyltrimethoxysilane and vinyltrimethoxysilane was obtained and permitted to

TABLE II

| Test | (1) Photochromic property | (2) Abrasion resistance | (3) Adhesivity of coat | (4) Heat-water resistance | (5) Heat resistance | (6) Chemical resistance |
| --- | --- | --- | --- | --- | --- | --- |
| Example 5 | pass | A | 100/100 | stable | stable | stable |
| Example 6 | pass | A | 100/100 | stable | stable | stable |
| Example 7 | pass | B | 100/100 | transform in the shape of lens | transform in the shape of lens | stable |
| Example 8 | pass | B | 100/100 | stable | stable | stable |
| Reference Example | | | | | | |
| CR-39 lens | colorless | D | — | stable | stable | stable |
| Polymethylmethacrylate board | colorless | E | — | somewhat unstable | transform | unstable |
| Inorganic glass | colorless | A | — | stable | stable | stable |
| VISTA SUNRAPID | pass | A | — | stable | stable | stable |

EXAMPLE 9

The lens of Example 9 was processed by the following two steps;

(1) Hydrolysis of γ-glycidoxypropyltrimethoxysilane and tetrmethoxysilane.

Into the glass reactor equipped with a stirrer and a condenser 110 parts of γ-glycidoxypropyltrimethoxysilane, 80 parts of tetramethoxysilane and 230 parts of isopropyl alcohol under stirring. There was further added 76 parts of 0.05 normal nitric acid solution under violent stirring at room temperature followed by stirring for one hour at room temperature. After the hydrolysis was completed the solution was permitted to stand undistrubed for one day and night at room temperature in order to age.

(2) Preparation of the coating composition and coating onto a lens surface.

age. The resulting solution was agitated for an hour in the presence of 80 parts of EPOLITE 40E ethyleneglycol diglycidylether and one part of BF$_3$O(C$_2$H$_5$)$_2$, 20 parts of silver iodide having an average particle size of from 50 mμ to 100 mμ and 10 parts of silver bromide were dispersed therein. 0.8 Parts of a DISLON AQ4200-10N flow control agent was added, followed by stirring with a homogenizer at 20000 rpm for one hour.

The resulting solution, which serves as a coating composition was coated onto a polycarbonate resin sunglass lens in the same manner as that in step (2) of Example 9. The coated lens which was transparent with somewhat of a yellowish color had a coating of 5μ in thickness on the surface thereof.

The results of Tests 1–6 and 8 performed on the coated lens are set forth in Table III.

EXAMPLE 11

To a mixture of 100 parts of β-(3,4-epoxycyclohexyl)ethyltrimethoxysilane, 35 parts of methyltrimethoxysilane, 15 parts of Aerosil having an average particle size of from 10 mµ to 15 mµ and 180 parts of isopropylalcohol in the glass reactor was added 44 parts of 0.05N sulfuric acid solution with stirring. The silanes were hydrolyzed in the same manner as that of step (1) of Example 9.

The hydrolyzed solution was stirred for half an hour at room temperature in the presence of 80 parts of trimethylolpropanetriglycidylether (called EPOLITE 100 MF and manufactured by Kyoeisha Yushi Chemical Co. Ltd. of Japan) and 1.5 parts of stannous chloride. To this was added 25 parts of silver bromide having an average particle size of about 50 mµ followed by violent stirring at room temperature to provide a mixed dispersion, which serves as the coating composition.

The coating composition was coated by the dipping process with a lifting speed of 10 cm/min onto the surface of an injection molded polymethylmethacrylate sunglass lens. The coat layer was cured in a hot air oven at a temperature of 60° C. for an hour followed by a temperature of 80° C. for three hours.

The coated lens, which was transparent with somewhat yellowish color had a coat of 2.5µ in thickness on the surface thereof.

The results of Tests 1-6 and 8 performed on the coated lens are set forth in Table III.

EXAMPLE 12

Into the glass reactor equipped with a stirrer and a condenser was added 149 parts of γ-methacryloxypropyltrimethoxysilane, 93 parts of tetraethoxysilane, 110 parts of isopropyl alcohol and 0.7 parts of a silicon based surfactant. There was added 80 parts of a 0.05N nitric acid solution under stirring at room temperature with the stirring continued for an additional hour. After permitting the solution to stand undisturbed for 24 hours for aging, the solution was stirred violently for an hour at room temperature in the presence of 90 parts of sorbitol polyglycidylether (called DENACOL EX-614 and manufactured by Nagase & Co., Ltd. of Japan), 1.8 parts of zinc chloride and 45 parts of silver bromide having an average particle size of about 40 mµ to provide a mixed dispersion.

The resulting mixed dispersion which serves as a coating composition was coated onto a synthetic resin SEIKO Hi-Lord lens of the type utilized in Example 8 by the dipping process with a lifting speed of 5 cm/min. The coated lens was cured in the same manner as that in Example 9 whreby a photochromic lens with a high refractive index was obtained. The coated lens was transparent with a somewhat yellowish color of 2.5µ in thickness.

The results of Tests 1-6 and 8 performed on the coated lens are set forth in Table III.

TABLE III

| Test | (1) Photochromic property | (2) Abrasion resistance | (3) Adhesivity of coat | (4) Heat-water resistance | (5) Heat resistance | (6) Chemical resistance | (8) Tintability by disperse-dye |
|---|---|---|---|---|---|---|---|
| Example 9 | pass | A | 100/100 | stable | stable | stable | excellent |
| Example 10 | pass | A | 100/100 | stable | stable | stable | excellent |
| Example 11 | pass | B | 100/100 | transform in the shape of lens | transform in the shape of lens | stable | excellent |
| Example 12 | pass | B | 100/100 | stable | stable | stable | excellent |
| Reference Example | | | | | | | |
| CR-39 lens | colorless | D | — | stable | stable | stable | excellent |
| Polymethylmethacrylate board | colorless | E | — | somewhat unstable | transform | unstable | excellent |
| Inorganic glass | colorless | A | — | stable | stable | stable | inferior |
| VISTA SUNRAPID | pass | A | — | stable | stable | stable | inferior |

EXAMPLE 13

The lens of Example 13 was processed by the following two steps;

(1) Hydrolysis of γ-glycidoxypropyltrimethoxysilane and tetramethoxysilane.

Into the glass reactor equipped with a stirrer and a condenser were placed 110 parts of γ-glycidoxypropyltrimethoxysilane, 80 parts of tetramethoxysilane and 230 parts of isopropylalcohol were placed. There was further added 76 parts of a 0.05 normal nitric acid solution under violent stirring at room temperature followed by stirring for one hour at room temperature. After the hydrolysis was completed, the resulting solution was permitted to stand undisturbed for one day and night at room temperature in order to age.

(2) Preparation of the coating composition and the coating thereof.

The hydrolyzed solution obtained in step (1) was stirred for half an hour at room temperature in the presence of 115 parts of 1,6-hexanediol diglycidylether (EPOLITE 1600), 1.2 parts of stannous chloride, 15 parts of 1,3,3-trimethylindolino-8-bromo-6'-bromobenzopyrylospiran, 5 parts of 1,3,3-trimethylindolino-7'-nitrobenzopyrylospiran, 10 parts 1,3,3-trimethylindolino-5'-nitro-8'-methoxybenzopyrylospiran and 0.2 parts of a silicon based surfactant to provide a mixed dispersion.

The resulting mixed dispersion which serves as the coating composition was coated onto a CR-39 lens by the dipping process with a lifting speed of 20 cm/min. The lens was cured at a temperature of 80° C. for 3 hours. The cured lens coating was transparent with somewhat a yellowish color before irradiation and 3µ in thickness.

The coated lens was subjected to the above-described Tests 1-4, 6 and 8 and the results are set forth in Table IV.

EXAMPLE 14

Into a glass reactor equipped with a stirrer and a condenser was added 100 parts of γ-glycidoxypropyltrimethoxysilane, 60 parts of vinyltrimethoxysilane and 200 parts of ethylcellosolve. There was further added 60 parts of a 0.01N nitric acid solution under violent stirring. The subsequent procedure was the same as that in step (1) of Example 13 whereby the hydrolyzed solution of γ-glycidoxypropyltrimethoxysilane and vinyltrimethoxysilane was obtained. The hydrolyzed solution was stirred for an hour in the presence of 80 parts of ethyleneglycol diglycidylether (EPOLITE 40E) and one part of $BF_3O(C_2H_5)_2$. There was dispersed in the solution 15 parts of 1,3,3-trimethylindolino-6'-nitrobenzopyrylospiran and 7.5 parts of 1,3,3-trimethylindolino-5'-nitro-8'-methoxybenzopyrylospiran. Then, 0.8 part "DISLON AQ4200-10N" flow control agent was added which was followed by stirring with a homogenizer at 20000 rpm for one additional hour.

The resulting solution which serves as a coating composition was coated onto a polycarbonate resin lens in the same manner as that in step (2) of Example 13. The coat layer was transparent with a somewhat bluish color before irradiation and was 5μ in thickness.

The results of Tests 1–4, 6 and 8 performed on the coated lens are set forth in Table IV.

TABLE IV

| Test | Example 13 | Example 14 |
|---|---|---|
| (1) Photochromic Property | pass | pass |
| Color before irradiation | light yellow | light blue |
| Color after irradiation | dark brown | dark purple |
| (2) Abrasion resistance | A | A |
| (3) Adhesivity resistance | 100/100 | 100/100 |
| (4) Heat resistance | stable | stable |
| (6) Chemical resistance | stable | stable |
| (8) Tintability by disperse-dye | excellent | excellent |

It will thus be seen that the objects set forth above, among those made apparent from the preceding description, are efficiently attained and, since certain changes may be made in carrying out the above process, in the described product, and in the product set forth without departing from the spirit and scope of the invention, it is intended that all matter contained in the above description and shown in the accompanying drawing shall be interpreted as illustrative and not in a limitng sense.

It is also to be under stood that athe following claims are intended to cover all of the generic and specific features of the invention herein described, and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

What is claimed is:

1. A photochromic synthetic resin ophthalmic lens, comprising a synthetic resin lens body coated with a photochromic surface hard coating having a thickness between about 1 to 30μ, the surface hard coat formed from at least one organic silane compound which has been hydrolyzed, the silane compound having the general formula (1) as follows:

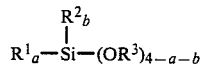
(1)

wherein $R^1$ is an organic group containing at least one group selected from vinyl, propyl, butyl, amino, imino, epoxy, methacryloxy, glycidoxy, phenyl and SH group, $R^2$ is hydrogen, a hydrocarbon group having from one to six carbon atoms or a vinyl group, $R^3$ is a hydrocarbon group having from one to five carbon atoms, an alkoxyalkyl group having from one to five carbon atoms or an acyl group having from one to four carbon atoms, a is an integer 0, 1 or 2 and b is an integer 0 or 1 wherein the relation of a and b is $a+b \leq 2$, and a photochromic material dispersed therein to provide a photochromic ophthalmic lens having improved abrasion resistance.

2. The photochromic lens of claim 1, wherein the surface hard coat further includes as least one epoxy compound and at least one epoxy curing catalyst.

3. The photochromic lens of claim 1, wherein a in the silane compound of formula (1) is only 1 or 2, and the surface hard coat is formed from at least one silane compound of formula (1) wherein a is 1 or 2 and at least one hydrolyzed silane compound having the general formula (2) as follows:

(2)

wherein $R^4$ is hydrogen or a hydrocarbon group having from one to six carbon atoms, $R^5$ is a hydrocarbon group having from one to five carbon atoms, an alkoxyalkyl group having from one to five carbon atoms or an acyl group having from one to four carbon atoms and c is an integer from 0 to 2.

4. The photochromic lens of claim 3, wherein the lens body is formed from a transparent synthetic resin selected from the group consisting of polycarbonate resins, acryl resins, diethylene glycol bisallylcarbonate resins, polystyrene, and copolymer of polystyrene and disphenol A derivative dimethacrylate ester.

5. A photochromic synthetic ophthalmic resin lens, comprising a synthetic resin lens body coated with a photochromic surface hard coat having a thickness between about 1 to 30μ, the surface hard coat formed from at least one silane compound which has been hydrolyzed, the silane compound having the general formula (1) as follows:

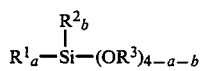
(1)

wherein $R^1$ is an organic group containing at least one group selected from vinyl, amino, imino, epoxy, methacryloxy, glycidoxy, phenyl and SH group, $R^2$ is hydrogen, a hydrocarbon group having from one to six carbon atoms or a vinyl group, $R^3$ is a hydrocarbon group having from one to five carbon atoms, an alkoxyalkyl group having from one to five carbon atoms or an acyl group having from one to four carbon atoms, a is an integer 0, 1 or 2 and b is an integer 0 or 1 wherein the relation of a and b is $a+b \leq 2$, at least one epoxy compound selected from the group consisting of mono-, di-, tri- and tetra-glycidyl ethers formed from polyhydric alcohols and unsaturated fatty acid compounds wherein the double bonds are at least partially epoxilated, at least one epoxy curing catalyst and a photochromic material dispersed therein, to provide a photochromic ophthalmic lens having improved abrasion resistance.

6. The photochromic lens of claim 5, wherein the photochromic material is selected from the group consisting of a silver halide, a molybdic acid amine compound, a dithyizone-mercury polymer and halogenated copper.

7. The photochromic lens of claim 6, wherein the silver halide is selected from the group consisting of silver bromide, silver chloride and silver iodide.

8. The photochromic lens of claim 5, wherein the photochromic material is a benzopyrylospiran compound having the general formula (3)

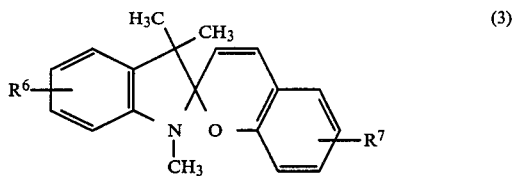
(3)

wherein $R^6$ is hydrogen, fluorine, chlorine, or bromine, and $R^7$ is hydrogen, fluorine, chlorine, bromine, a nitro group or a methoxy group.

9. The photochromic lens of claim 5, wherein the polyhydric alcohols are selected from the group consisting of (poly)ethyleneglycol, (poly)propyleneglycol, glycerol, neopentylglycol, 1,6-hexanediol, trimethylolpropane, pentaerythritol, glycerol, sorbitol and bisphenol A which may include remaining —OH groups.

10. The photochromic lens of claim 5, wherein the epoxy-curing catalyst is selected from the group consisting of Lewis acids, Broensted acids and metal chelate compounds.

11. The photocromic lens of claim 5 therein main additive material is colloidal silica of from 1 mμ to 100 mμ.

12. A photochromic synthetic resin ophthalmic lens, comprising a synthetic resin lens body coated with a photochromic surface hard coat having a thickness between about 1 and 30μ, the surface hard coat formed from at least one organic silane compound which has been hydrolyzed, the silane compound having the general formula (1) as follows:

(1)

wherein $R^1$ is an organic group containing at least one group selected from vinyl, amino, imino, epoxy, methacryloxy, glycidoxy, phenyl and SH group, $R^2$ is hydrogen, a hydrocarbon group having from one to six carbon atoms or a vinyl group, $R^3$ is a hydrocarbon group having from one to five carbon atoms, an alkoxyalkyl group having from one to five carbon atoms or an acyl group having from one to four carbon atoms, a is an integer 0, 1 or 2 and b is an integer 0 or 1 wherein the relation of a and b is $a+b \leq 2$, at least one epoxy compound selected from the group consisting of mono-, di, tri- and tetraglycidyl ethers formed from polyhydric alcohols, an epoxy curing catalyst and a photochromic material dispersed therein, to provide a photochromic opthalic lens having improved abrasion resistance.

13. A photochromic lens of claim 12, wherein the photochromic material is selected from the group consisting of a silver halide and a benzopyrylospiran compound having the general formula (3)

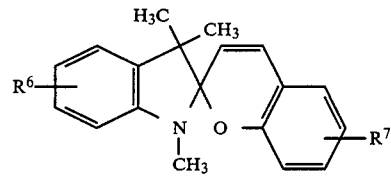

wherein $R^6$ is hydrogen, fluorine, chlorine, or bromine, and $R^7$ is hydrogen, fluorine, chlorine, bromine, a nitro group or a methoxy group.

14. The photocromic lens of claim 12 therein main additive material is colloidal silica of from 1 mμ to 100 mμ.

15. The photochromic lens of claim 14, wherein the lens body is formed from a transparent synthetic resin selected from the group consisting of polycarbonate resins, acryl resins, diethylene glycol bisallylcarbonate resins, polystyrene, and copolymer of polystyrene and disphenol A derivative dimethacrylate ester.

16. The photochromic lens of claim 12, wherein the organic silane compounds are selected from the group consisting of
γ-glycidoxypropyltrimethoxysilane,
vinyltrimethoxysilane,
γ-glycidoxypropylmethyldiethoxysilane,
β-(3,4-epoxycyclohexyl)ethyltrimethoxysilane,
γ-methacryloxypropyltrimethoxysilane,
(2,3-epoxypropoxy)methyltrimethoxysilane,
tetramethoxysilane,
tetraethoxysilane, and
methyltrimethoxysilane.

17. The photochromic lens of claim 12, wherein the epoxy compound is selected from the group consisting of
1,6 hexanedioldiglycidylether,
ethyleneglycoldiglycidylether,
trimethylolpropanetriglycidylether,
sorbitolpolyglycidylether, and
glyceroldiglycidylether.

18. The plotochromic lens of claim 12, therein main additive material is colloidal silica of from 1 mμ to 100 mμ.

* * * * *